United States Patent
Houston

Patent Number: 5,356,157
Date of Patent: Oct. 18, 1994

[54] INTERNAL LIVE LOADING PACKING GLAND

[76] Inventor: James L. Houston, 3534 E. 109th St., Tulsa, Okla. 74137

[21] Appl. No.: 181,627

[22] Filed: Jan. 13, 1994

Related U.S. Application Data

[63] Continuation of Ser. No. 910,669, Jul. 8, 1992, Pat. No. 5,290,046.

[51] Int. Cl.⁵ ............................................. F16J 15/18
[52] U.S. Cl. ............................................ 277/1; 277/9; 277/105; 277/126
[58] Field of Search ........................ 277/1, 9, 9.5, 102, 277/105, 106, 108, 110, 111, 123, 59, 64, 60, 62, 126, 136, 189

[56] References Cited

U.S. PATENT DOCUMENTS

| | | | |
|---|---|---|---|
| 3,432,172 | 3/1969 | Hendrickson | 277/1 |
| 4,328,974 | 5/1982 | White et al. | 277/1 |
| 4,451,047 | 5/1984 | Herd et al. | 277/26 |
| 4,899,899 | 2/1990 | Junier | 220/3 |

*Primary Examiner*—Diego F. F. Gutierrez
*Assistant Examiner*—Daniel G. DePumpo
*Attorney, Agent, or Firm*—Catalano, Zingerman & McKay

[57] ABSTRACT

Live loading is applied on each end of both the secondary and the primary packing of a packing gland. After installing the primary packing assembly and a lantern ring, the primary packing is compressed to proper specifications. While the primary gland is so compressed, it is locked into place using lantern ring lock bolts. The secondary packing assembly and a follower are then installed. The secondary gland is also compressed to proper specifications and the follower secured in place. The lantern ring lock bolts are then removed, both internally and externally live loading the packing gland. A single assembly of the present live loaded packing can also be installed in the gland from the process side, eliminating the need for purging and resulting in a most efficient purgeless gland.

9 Claims, 1 Drawing Sheet

INTERNAL LIVE LOADING PACKING GLAND

This is a continuation of copending application Ser. No. 07/910,669, filed on Jul. 8, 1992, now U.S. Pat. No. 5,290,046.

BACKGROUND OF THE INVENTION

This invention relates generally to packing glands and more particularly concerns live loading packing glands.

Presently known packing glands use a primary set of packing consisting of five to six rings of packing, a lantern ring followed by a secondary set of packing consisting of five to six rings of packing and a follower to compress the packing. In some instances the follower is live loaded by springs or Beleville washers which maintain a constant pressure on the packing and create a type of constant adjustment to the packing.

There are several problems with these glands. Due to the mass and density of packing materials, a maximum of five rings of packing can be compressed. Since the present live loading glands only apply a pressure to the outer end of the secondary packing, once the gland has been packed, neither the follower nor the live loading has the ability to tighten or compress the primary packing.

Since the primary packing is not properly compressed, leakage in a valve incorporating the gland is prevented primarily by the secondary packing gland. During its initial life, the primary packing gland minimizes but does not eliminate leakage. During the continued life of the gland, as leakage continues, the seepage rate of the process into the gland increases, further damaging the primary gland and increasing the rate of seepage. This is especially true if the process employs highly corrosive catalysts which accelerate erosion of both the gland and the stem which it surrounds.

It is, therefore, an object of this invention to provide a packing gland that makes effective use of its primary packing. It is a further object of this invention to provide a packing gland in which the primary and secondary packing are both compressed under relatively uniform compression. A correlative object of this invention is to provide a packing gland which employs both internal and external gland compression.

SUMMARY OF THE INVENTION

In accordance with the invention, live loading is applied on each end of both the secondary and the primary packing. To properly live load the packing gland, a lantern ring is locked in place after the packing of the primary packing. After installing the primary packing assembly and the lantern ring, the primary packing is compressed to proper specifications, which change with the size of the glands. While the primary gland is compressed, it is locked into place using lantern ring lock bolts. The secondary packing assembly and follower are then installed. The secondary gland is compressed to the proper specifications and the follower secured in place. The lantern ring lock bolts are removed and replaced with vent valves. The packing gland is thus both internally and externally live loaded.

Furthermore, most glands utilize a purge medium to create a barrier between the regular packing and the process. But a single assembly of the present live loaded packing can be installed in the gland from the process side, eliminating the need for purging and resulting in a most efficient purgeless gland.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
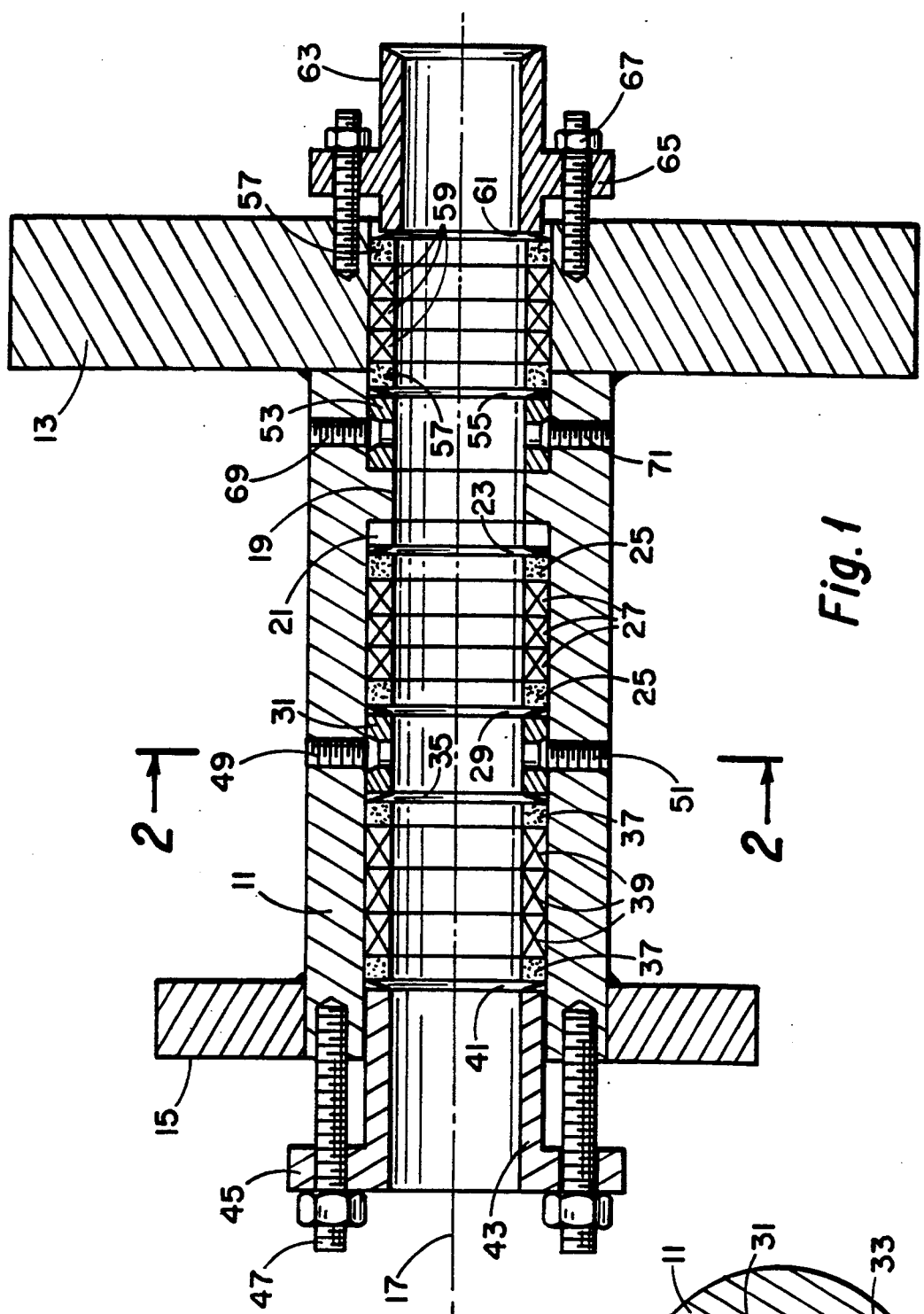
FIG. 1 is a sectional view taken along the longitudinal axis of the preferred embodiment of the internal live loading packing gland.

Turning to FIG. 1, the preferred embodiment of the internal live loading packing gland is illustrated. A valve stuffing box cylinder or casing box 11 extends from the valve bonnet 13 through a valve actuator mounting plate 15. A circular bore extends through the casing 11 and the bonnet 13 along a longitudinal axis 17 on which the valve stem (not shown) will be centered. Disposed along an interior surface of the casing 11 is an annular stop 19, as shown proximate the bonnet 13. In the assembly of the packing gland, a stop ring 21 may be inserted into the bore and seated on the annular stop 19. The first annular primary bias 23 is inserted against the stop ring 21 or the annular stop 19 if the stop ring 21 is not used. With the bias member 23 in place, the primary packing is inserted into the bore. As shown, the primary packing consists of five packing rings including the outside packing rings 25 and the inside packing rings 27. A second annular primary bias 29 is then inserted against the outermost outside packing ring 25. To complete the primary packing, a locking or lantern ring 31 is inserted against a second annular primary bias 29.

Figure 2:
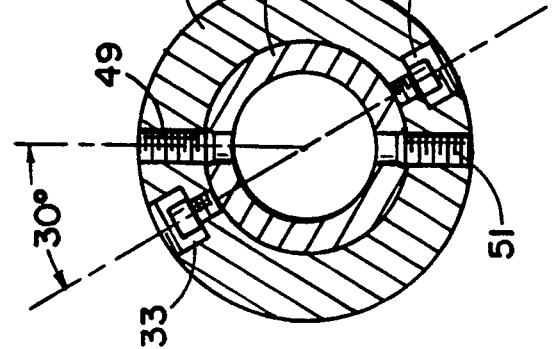
FIG. 2 is a cross-sectional view taken along the line 2—2 of FIG. 1.

As shown in FIG. 2, the locking ring 31 can be locked in place by one or more set screws or locking bolts 33 set in threaded apertures in the casing 11. Thus, with the primary packing gland and the locking ring 31 loaded into the casing, the packing rings 25 and 27 and biases 23 and 29 can be compressed between the stop 19 or stop ring 21 and the locking ring 31 to a preselected compressive load condition. The locking bolt or bolts 33 can then be tightened down on the locking ring 31 to secure the locking ring 31 in place and maintain the preselected compression in the primary packing gland. Once the primary packing gland has been so packed, a first annular secondary bias 35 can be inserted in the bore against the locking ring 31. The secondary packing including outside packing rings 37 and inside packing rings 39 is then inserted into the bore. A second annular secondary bias 41 is then seated against the outermost of the outside packing rings 37. A follower 43 is then inserted into the bore and seated against the second annular secondary bias 41. Now the secondary packing, including the biases 35 and 41 and packing rings 37 and 39 are compressed between the locking ring 31 and the follower 43 to a preselected compressive load condition. The follower 43 has a flange 45 through which bolts 47 extend so that the follower 43 may be secured to the casing 11 to maintain the preselective compressive load condition in the secondary packing gland. With the primary and secondary packing glands thus compressively loaded, the locking bolt or bolts 33 may be withdrawn to release the locking ring 31 to slide within the bore of the casing 11. The bolts 33 may be replaced with vent valves (not shown), and, to this end the locking bolts 33 are preferably set at a suitable angle, say 33° in relation to the diameter of the locking ring 31 which extends through the sealant inlet 49 and the drain 51. The end result of this arrangement is that both the primary and secondary packing glands are live loaded because they are each provided with their own bias.

As shown, the casing 11 may also be provided with a sealant inlet 49 and a drain 51.

If it is desirable to employ a purgeless packing gland, then, as shown, a similar packing arrangement can be provided at the process end of the casing 11. A spacing ring 53 may be inserted in the end of the bore to be seated against the opposite side of the stop 19 as the primary packing components. If the spacing ring 53 is employed, then a first annular process bias 55 is inserted in the bore against the spacing ring 53. Otherwise, the bias 55 will be seated against the stop 19. The processed packing is then inserted in the bore, including outside processed packing rings 57 and inside processed packing rings 59. A second annular process bias 61 is then inserted to complete the process packing and a process follower, which may be the valve stem guard bushing 63 as shown, is inserted in the bore against the second process bias 61. The process packing, including the biases 55 and 61 and packing rings 57 and 59, may then be compressed between the spacing ring 53 or the stop 19 and the process follower 63 to a preselected compressive load condition. A flange 65 on the process follower 63 holds bolts 67 which may be threaded into the casing 11 or the bonnet 13 as shown to secure the process follower 63 in position and maintain the preselective compressive load condition in the process packing. As shown, the casing 11 may include a vent 69 and a drain 71 extending therethrough to ports in the spacing ring 53.

As shown in FIG. 1, the biases 23, 29, 35, 41, 55 and 61 are single Belleville washers having their outer diameter rims abutting the outermost packing rings 25, 37 and 57 of the primary, secondary and process packing. Depending on the amount of compression desired, a number of Belleville washers might be used to constitute each bias. If more than one Belleville washer is used, the washers will be alternately inverted from those washers which are in abutment with the packing rings. The outer diameter rim of the abutting washer, however, must be in abutment with the packing rings so as to cause the packing rings to compress inwardly toward the valve stem (not shown).

As shown in FIG. 1, two outside rings and three inside rings are used in each packing. However, any number of one or more packing rings could be employed. Furthermore, the primary, secondary and process packing in the same valve could employ different numbers of washers and packing rings in each packing. The application of each valve will dictate the number of biases, the number of packing rings and the sizes of biases and packing rings necessary for that valve. Moreover, the biases need not necessarily be Belleville washers, but might be any resiliently compressible member such as, for example, a helical compression spring.

Thus, it is apparent that there has been provided, in accordance with the invention, an internal live loading packing gland that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A method of packing a gland having a bore in a casing comprising the steps of:
    inserting a first resiliently compressible member into the bore and against a stop in the packing gland;
    inserting at least one primary packing ring into the bore and against said first member;
    inserting a second resiliently compressible member into the bore and against said at least one primary packing ring;
    inserting a locking ring into the bore and against said second member;
    compressing said first and second compressible members and said primary packing ring between the stop and said locking ring to a predetermined first compressive load condition;
    securing said locking ring to the casing to maintain said predetermined first compressive load condition;
    inserting a third resiliently compressible member into the bore and against said secured locking ring;
    inserting at least one secondary packing ring into the bore and against said third member;
    inserting a fourth resiliently compressible member into the bore and against said at least one secondary packing ring;
    inserting a follower into the bore and against said fourth member;
    compressing said third and fourth compressible members and said at least one secondary packing ring between said secured locking ring and said follower to a predetermined second compressive load condition;
    securing said follower to the casing in said predetermined second compressive load condition; and
    releasing said locking ring from the casing to be slidable in the bore.

2. A method according to claim 1 further comprising the steps of:
    inserting a fifth resiliently compressible member into the bore and against an opposite side of the stop from said first resiliently compressible means;
    inserting at least one process packing ring into the bore and against said fifth member;
    inserting a sixth resiliently compressible member into the bore and against said at least one process packing ring;
    inserting a process follower int the bore and against said sixth member;
    compressing said fifth and sixth compressible members and said process packing ring between the stop and said process follower to a predetermined third compressible load condition;
    securing said process follower to the casing in said predetermined third compressive load condition.

3. A method according to claim 2 further comprising the step of inserting a spacing between the stop and said fifth resilient member.

4. A method of packing a gland having a bore in a casing comprising the steps of:
- inserting a first resiliently compressible member and at least one primary packing ring into the bore in back-to-back relationship in the packing gland;
- inserting a locking ring into the bore to sandwich said first member and said at least one primary packing ring between said locking ring and a stop in the casing;
- compressing said first compressible member and said at least one primary packing ring between the stop and said locking ring to a predetermined first compressive load condition;
- securing said locking ring to the casing to maintain said predetermined first compressive load condition;
- inserting a second resiliently compressible member and at least one secondary packing ring into the bore in back-to-back relationship;
- inserting the follower into the bore to sandwich said second member and said at least one secondary packing ring between said follower and said second locking ring;
- compressing said second compressible member and said at least one secondary packing ring between said secured locking ring and said follower to a predetermined second compressive load condition;
- securing said follower to the casing to maintain said predetermined second compressive load condition; and
- releasing said locking ring from the casing to be slidable in the bore.

5. A method according to claim 4 further comprising the steps of:
- inserting a third resiliently compressible member and at least one process packing ring into the bore in back-to-back relationship and against an opposite side of the stop from said first resiliently compressible means;
- inserting a process follower into the bore to sandwich said third member and said at least one process packing ring between said process follower and the stop;
- compressing said third compressible member and said at least on process packing ring between the stop and said process follower to a predetermined third compressive load condition; and
- securing said process follower to the casing to maintain said predetermined third compressive load condition.

6. A method according to claim 5 further comprising the step of inserting a spacing ring between the stop and said third resilient member.

7. A method of packing a gland having a bore in a casing comprising the steps of:
- inserting a first resiliently compressible member, at least one primary packing ring and a second resiliently compressible member in series into the bore;
- inserting a locking ring into the bore to sandwich said first member said at least one primary packing ring and said second member between said locking ring and a stop in the casing;
- compressing said first and second compressible members and said at least one primary packing ring between the stop and said locking ring to a predetermined first compressive load condition;
- securing said locking ring to the casing to maintain said predetermined first compressive load condition;
- inserting a third resiliently compressible member, at least one secondary packing ring and a fourth resiliently compressible member in series into the bore;
- inserting a follower into the bore to sandwich said third member, said at least one secondary packing ring and said fourth member between said follower and said secured locking ring;
- compressing said third and fourth compressible members and said at least one secondary packing ring between said secured locking ring and said follower to a predetermined second compressive load condition;
- securing said follower to the casing to maintain said predetermined second compressive load condition; and
- releasing said locking ring from the casing to be slidable in the bore.

8. A method according to claim 7 further comprising the steps of:
- inserting a fifth resiliently compressible member, at least one process packing ring and a sixth resiliently compressible member in series into the bore and against an opposite side of the stop from said first resiliently compressible means;
- inserting a process follower into the bore to sandwich said fifth member, said at least one process packing ring and said sixth member between said process follower and the stop;
- compressing said fifth and sixth compressible members and said process packing ring between the stop and said process follower to a predetermined third compressive load condition;
- securing said process follower to the casing to maintain said predetermined third compressive load condition.

9. A method according to claim 8 further comprising the step of inserting a spacing ring between the stop and said fifth resilient member.

* * * * *